United States Patent
Park

(10) Patent No.: US 11,568,782 B2
(45) Date of Patent: Jan. 31, 2023

(54) METHOD OF DRIVING A DISPLAY PANEL THAT INCLUDES A FIRST DISPLAY REGION HAVING A FIRST RESOLUTION AND A SECOND DISPLAY REGION BEING ADJACENT TO THE FIRST DISPLAY REGION AND HAVING A SECOND RESOLUTION HIGHER THAN THE FIRST RESOLUTION

(71) Applicant: Samsung Display Co., Ltd., Yongin-Si (KR)

(72) Inventor: Jong-Woong Park, Seongnam-si (KR)

(73) Assignee: Samsung Display Co., Ltd.

( * ) Notice: Subject to any disclaimer, the term of this patent is extended or adjusted under 35 U.S.C. 154(b) by 71 days.

(21) Appl. No.: 16/997,844

(22) Filed: Aug. 19, 2020

(65) Prior Publication Data

US 2021/0065606 A1    Mar. 4, 2021

(30) Foreign Application Priority Data

Aug. 29, 2019    (KR) .......................... 10-2019-0106389

(51) Int. Cl.
*G09G 3/20* (2006.01)
*H04N 5/225* (2006.01)

(52) U.S. Cl.
CPC ......... *G09G 3/2003* (2013.01); *G09G 3/2007* (2013.01); *G09G 2320/0233* (2013.01);
(Continued)

(58) Field of Classification Search
CPC .............. G09G 3/2003; G09G 3/2007; G09G 2320/0233; G09G 2320/0242;
(Continued)

(56) References Cited

U.S. PATENT DOCUMENTS

| 7,675,492 B2 | 3/2010 | Park et al. |
| 2011/0090265 A1* | 4/2011 | Muroi .................. G09G 3/3413 345/102 |

(Continued)

FOREIGN PATENT DOCUMENTS

| CN | 108417149 A | 8/2018 |
| CN | 109872670 A | 6/2019 |
| EP | 3176772 A1 | 6/2017 |

*Primary Examiner* — Roy P Rabindranath
(74) *Attorney, Agent, or Firm* — Innovation Counsel LLP

(57) ABSTRACT

A method of driving a display panel that includes first and second display-regions includes: determining maximum luminance data among first data including first red data, first green data, and first blue data for the first display-region, calculating a threshold gray-level based on a luminance gain, a gray-level of the maximum luminance data, and a gamma value for the display panel, selecting a smaller value between the threshold gray-level and a maximum gray-level as a gain determination gray-level, calculating a compensation gain obtained by dividing the gain determination gray-level by the gray-level of the maximum luminance data, generating first compensated data by applying the compensation gain to the first data, displaying a first-image in the first display-region based on the first compensated data, and displaying a second-image in the second display-region based on second data including second red data, second green data, and second blue data for the second display-region.

14 Claims, 10 Drawing Sheets

(52) U.S. Cl.
CPC ............. *G09G 2320/0242* (2013.01); *G09G 2320/046* (2013.01); *G09G 2320/0686* (2013.01); *G09G 2340/0407* (2013.01); *H04N 5/2257* (2013.01)

(58) Field of Classification Search
CPC ... G09G 2320/0686; G09G 2340/0407; H04N 5/2257
See application file for complete search history.

(56) References Cited

U.S. PATENT DOCUMENTS

| | | | |
|---|---|---|---|
| 2014/0160142 A1 | 6/2014 | Lee et al. | |
| 2019/0206953 A1 | 7/2019 | Hsieh et al. | |
| 2020/0161399 A1* | 5/2020 | Park | H01L 27/326 |
| 2021/0049950 A1* | 2/2021 | Bae | G09G 3/20 |

* cited by examiner

METHOD OF DRIVING A DISPLAY PANEL THAT INCLUDES A FIRST DISPLAY REGION HAVING A FIRST RESOLUTION AND A SECOND DISPLAY REGION BEING ADJACENT TO THE FIRST DISPLAY REGION AND HAVING A SECOND RESOLUTION HIGHER THAN THE FIRST RESOLUTION

CROSS-REFERENCE TO RELATED APPLICATION(S)

This application claims priority under 35 USC § 119 to Korean Patent Application No. 10-2019-0106389, filed on Aug. 29, 2019 in the Korean Intellectual Property Office (KIPO), the disclosure of which is incorporated herein in its entirety by reference.

BACKGROUND

1. Technical Field

The present inventive concept relates generally to a method of driving a display panel. More particularly, the present inventive concept relates to a method of driving a display panel that includes a first display region having a first resolution in which at least one transparent region is located and a second display region having a second resolution that is higher than the first resolution

2. Description of the Related Art

As consumers put an importance on an exterior design of an electronic device (e.g. smartphone, etc.), technologies have been developed for providing a hole in a display panel of an electronic device to dispose a camera module (i.e., a front camera module) and/or a sensor module (i.e., a front sensor module) under the display panel and expose them through the hole to impart an image capturing capability using the camera module and/or a sensing capability using the sensor module. Further, recently, many manufacturers try to apply a technology to the electronic device for making a low resolution display region having a resolution lower than that of a normal display region in the display panel by disposing at least one transparent region and a plurality of unit pixels in the low resolution display region. In this case, the electronic device can display an image in the low resolution display region using the unit pixels and perform image capturing using the camera module and/or sensing using the sensor module through the transparent region of the low resolution display region. Since the number of unit pixels per a unit area in the low resolution display region is smaller than that in the normal display region, the low resolution display region may have a luminance lower than that of the normal display region under the same condition. Thus, due to a luminance difference may occur between the low resolution display region and the normal display region even under the same condition, a boundary between the low resolution display region and the normal display region may stand out, and thus a viewer (or user) may perceive image quality degradation due to existence of the low resolution display region. To overcome these problems, a conventional method may increase the luminance of the low resolution display region by increasing a current flowing in the unit pixels in the low resolution display region. However, the increased current may rapidly deteriorate and reduce life of the unit pixels in the low resolution display region, and thus a permanent afterimage or the like due to the deterioration may occur.

SUMMARY

The present disclosure provides a method of driving a display panel that includes a first display region having a first resolution in which at least one transparent region is located and a second display region having a second resolution higher than the first resolution. The display panel is capable of minimizing or preventing a boundary between the first display region and the second display region from standing out or being perceivable to a user that may be caused by a luminance difference between the first display region and the second display region by optimally increasing a luminance of the first display region using a gray-level of maximum luminance data applied to the first display region such that the luminance difference may be minimized or reduced, and deterioration of unit pixels included in the first display region may be minimized or reduced.

According to one embodiment, a method of driving a display panel that includes a first display region and a second display region being adjacent to the first display region and having a second resolution higher than the first resolution may include: determining maximum luminance data among first red data, first green data, and first blue data that are applied to the first display region; calculating a threshold gray-level based on a luminance gain corresponding to a value obtained by dividing a second reference luminance of the second display region by a first reference luminance of the first display region, a gray-level of the maximum luminance data, and a gamma value for the display panel; selecting a smaller value between the threshold gray-level and a maximum gray-level for the display panel as a gain determination gray-level; calculating a compensation gain corresponding to a value obtained by dividing the gain determination gray-level by the gray-level of the maximum luminance data; generating first compensated red data, first compensated green data, and first compensated blue data by applying the compensation gain to the first red data, the first green data, and the first blue data; displaying a first image in the first display region based on the first compensated red data, the first compensated green data, and the first compensated blue data; and displaying a second image in the second display region based on second red data, second green data, and second blue data that are applied to the second display region.

In one embodiment, a camera module that captures an image or a sensor module that provides a sensing capability may be disposed under the first display region.

In one embodiment, determining the maximum luminance data may include: determining maximum red luminance data among the first red data; determining maximum green luminance data among the first green data; determining maximum blue luminance data among the first blue data; and determining data that has a highest luminance among the maximum red luminance data, the maximum green luminance data, and the maximum blue luminance data as the maximum luminance data.

In one embodiment, determining the maximum luminance data may include: obtaining a first count number by counting the first red data in a first order of implementing a first high luminance; determining last counted red data as maximum red luminance data based on the first count number being equal to a reference number; obtaining a second count number by counting the first green data in a second order of implementing a second high luminance; determining last counted green data as maximum green luminance data based on the second count number being equal to the reference number; obtaining a third count number by counting the first blue data in a third order of implementing a third high luminance; determining last counted blue data as maximum blue luminance data based on the third count number being equal to the reference number; and determining data that has a highest luminance among the maximum red luminance data, the maximum green luminance data, and the maximum blue luminance data as the maximum luminance data.

In one embodiment, determining the maximum luminance data may include: dividing a gray-level range for the display panel into sub gray-level ranges; obtaining a first count number by counting the first red data in a first order of implementing a first high luminance; determining a first target sub gray-level range to which last counted red data belongs among the sub gray-level ranges based on the first count number being equal to a reference number; determining data corresponding to a first lowest gray-level in the first target sub gray-level range as maximum red luminance data; obtaining a second count number by counting the first green data in a second order of implementing a second high luminance; determining a second target sub gray-level range to which last counted green data belongs among the sub gray-level ranges based on the second count number being equal to the reference number; determining data corresponding to a second lowest gray-level in the second target sub gray-level range as maximum green luminance data; obtaining a third count number by counting the first blue data in a third order of implementing a third high luminance; determining a third target sub gray-level range to which last counted blue data belongs among the sub gray-level ranges based on the third count number being equal to the reference number; determining data corresponding to a third lowest gray-level in the third target sub gray-level range as maximum blue luminance data; and determining data that implements a highest luminance among the maximum red luminance data, the maximum green luminance data, and the maximum blue luminance data as the maximum luminance data.

In one embodiment, the threshold gray-level may be calculated by $LGL=MD \times LG^{1/\lambda}$, where LGL denotes the threshold gray-level, MD denotes the gray-level of the maximum luminance data, LG denotes the luminance gain, and denotes the gamma value for the display panel.

In one embodiment, the first reference luminance of the first display region may correspond to a first maximum luminance of the first display region based on reference data, and the second reference luminance of the second display region may correspond to a second maximum luminance of the second display region based on the reference data.

In one embodiment, generating the first compensated red data, the first compensated green data, and the first compensated blue data may include: calculating first gray-levels of the first compensated red data by multiplying gray-levels of the first red data by the compensation gain calculating second gray-levels of the first compensated green data by multiplying gray-levels of the first green data by the compensation gain and calculating third gray-levels of the first compensated blue data by multiplying gray-levels of the first blue data by the compensation gain.

In one embodiment, generating the first compensated red data, the first compensated green data, and the first compensated blue data may further include: limiting the first gray-levels of the first compensated red data, the second gray-levels of the first compensated green data, and the third gray-levels of the first compensated blue data to being equal to or below the maximum gray-level for the display panel.

In one embodiment, the method may further include: dividing the second display region into an adjacent display region surrounding the first display region and a non-adjacent display region excluding the adjacent display region; and reducing a luminance of the adjacent display region in a direction from the non-adjacent display region toward the first display region.

In one embodiment, the luminance of the adjacent display region may be linearly reduced in the direction from the non-adjacent display region toward the first display region.

In one embodiment, the luminance of the adjacent display region may be non-linearly reduced in the direction from the non-adjacent display region toward the first display region.

In one embodiment, the luminance of the adjacent display region may be calculated by $AL=OL \times LSR$, where AL denotes the luminance of the adjacent display region, OL denotes an original luminance of the adjacent display region, and LSR denotes a luminance slope ratio.

In one embodiment, the minimum value of the luminance slope ratio may be a reciprocal of the luminance gain, a maximum value of the luminance slope ratio may be 1, and the luminance slope ratio may be reduced in the direction from the non-adjacent display region toward the first display region.

According to another embodiment, a method of driving a display panel that includes a first display region and a second display region being adjacent to the first display region and having a second resolution higher than the first resolution may include: determining maximum luminance data among first data that are applied to the first display region; calculating a first candidate compensation gain based on a luminance gain corresponding to a first value obtained by dividing a second reference luminance of the second display region by a first reference luminance of the first display region and a gamma value for the display panel; calculating a second candidate compensation gain corresponding to a second value obtained by dividing a maximum gray-level for the display panel by a gray-level of the maximum luminance data; determining a smaller value between the first candidate compensation gain and the second candidate compensation gain as a compensation gain; generating first compensated data by applying the compensation gain to the first data; displaying a first image in the first display region based on the first compensated data; and displaying a second image in the second display region based on second data that are applied to the second display region.

In one embodiment, the first candidate compensation gain may be calculated by $FCG=LG^{1/\lambda}$, where FCG denotes the first candidate compensation gain, LG denotes the luminance gain, and $\lambda$ denotes the gamma value for the display panel.

In one embodiment, the first reference luminance of the first display region may correspond to a first maximum luminance of the first display region based on reference data, and the second reference luminance of the second display region may correspond to a second maximum luminance of the second display region based on the reference data.

In one embodiment, generating the first compensated data may include calculating first gray-levels of the first compensated data by multiplying gray-levels of the first data by the compensation gain.

In one embodiment, generating the first compensated data may further include limiting the first gray-levels of the first compensated data to being equal to or below the maximum gray-level for the display panel.

In one embodiment, the method may further include: dividing the second display region into an adjacent display region surrounding the first display region and a non-adjacent display region excluding the adjacent display region; and reducing a luminance of the adjacent display region in a direction from the non-adjacent display region toward the first display region.

The present method of driving a display panel may determine maximum luminance data among first red data, first green data, and first blue data that are applied to the first display region, may calculate a threshold gray-level based on a luminance gain corresponding to a value obtained by dividing a second reference luminance of the second display region by a first reference luminance of the first display region, a gray-level of the maximum luminance data, and a gamma value that is set for the display panel, may select a smaller value between the threshold gray-level and a maximum gray-level for the display panel as a gain determination gray-level, may calculate a compensation gain corresponding to a value obtained by dividing the gain determination gray-level by the gray-level of the maximum luminance data, may generate first compensated red data, first compensated green data, and first compensated blue data by applying the compensation gain to the first red data, the first green data, and the first blue data, may display a first image in the first display region based on the first compensated red data, the first compensated green data, and the first compensated blue data, and may display a second image in the second display region based on second red data, second green data, and second blue data that are applied to the second display region.

In addition, the present method of driving a display panel may determine maximum luminance data among first data that are applied to the first display region, may calculate a first candidate compensation gain based on a luminance gain corresponding to a value obtained by dividing a second reference luminance of the second display region by a first reference luminance of the first display region and a gamma value that is set for the display panel, may calculate a second candidate compensation gain corresponding to a value obtained by dividing a maximum gray-level for the display panel by a gray-level of the maximum luminance data, may determine a smaller value between the first candidate compensation gain and the second candidate compensation gain as a compensation gain, may generate first compensated data by applying the compensation gain to the first data, may display a first image in the first display region based on the first compensated data, and may display a second image in the second display region based on second data that are applied to the second display region. Thus, the present method of driving the display panel may prevent a boundary between the first display region and the second display region from standing out or being perceivable to a user that may be caused by a luminance difference between the first display region and the second display region by optimally increasing a luminance of the first display region such that the luminance difference may be minimized and deterioration of unit pixels included in the first display region may be minimized. As a result, the method of driving the display panel may prevent or minimize a user's perception of image quality degradation due to existence of the first display region.

BRIEF DESCRIPTION OF THE DRAWINGS

Illustrative, non-limiting embodiments will be more clearly understood from the following detailed description in conjunction with the accompanying drawings.

DETAILED DESCRIPTION OF THE EMBODIMENTS

Hereinafter, some example embodiments of the present inventive concept will be explained in detail with reference to the accompanying drawings.

Figure 1:
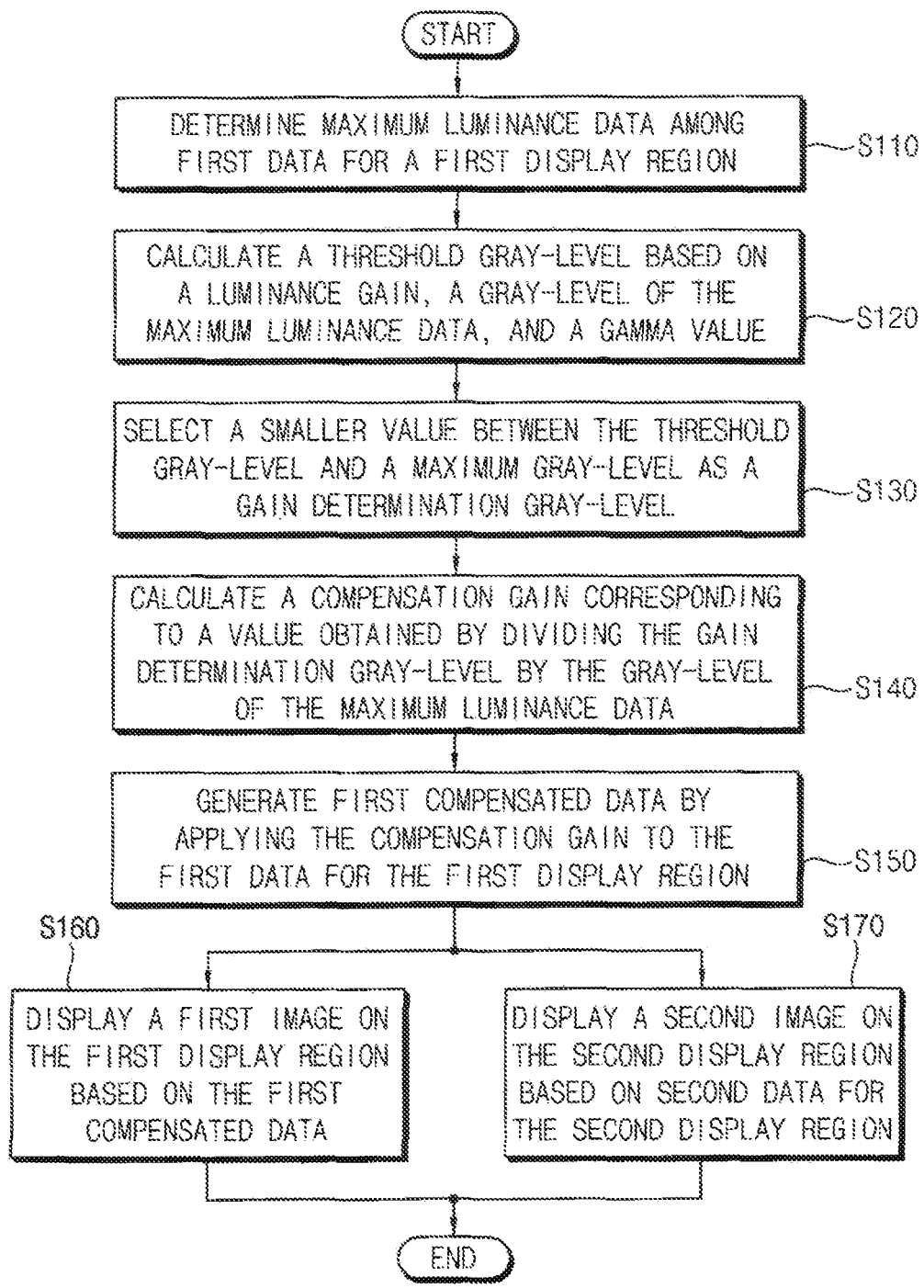
FIG. 1 is a flowchart illustrating a method of driving a display panel according to one embodiment.
Figure 2:
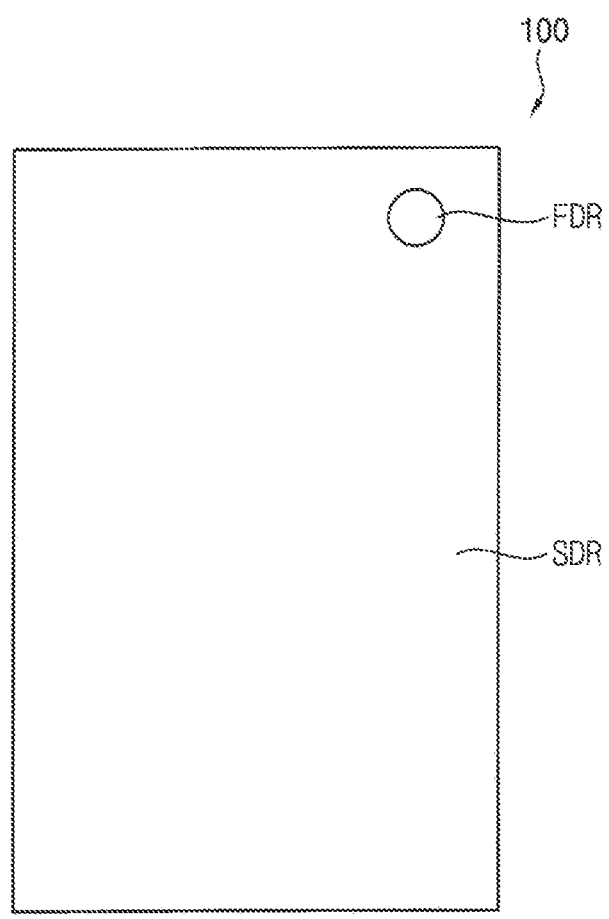
FIG. 2 illustrates an example of a display panel that is driven by the method of FIG. 1.
Figure 3:
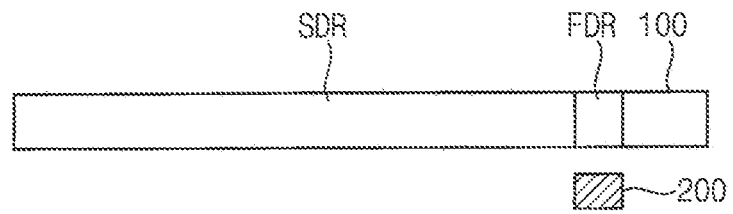
FIG. 3 illustrates an example in which a camera module is disposed under the display panel of FIG. 2.
Figure 4:
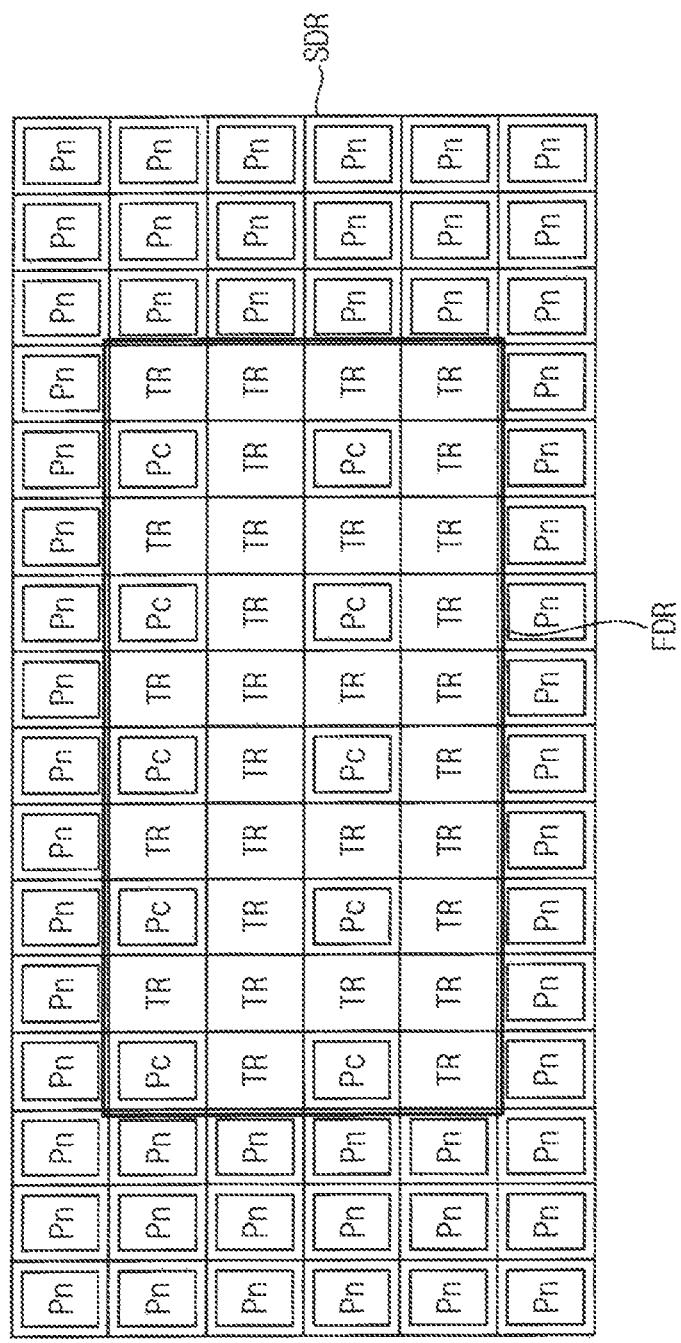
FIG. 4 illustrate an example of first and second display regions included in the display panel of FIG. 2.

FIG. 1 is a flowchart illustrating a method of driving a display panel according to one embodiment, FIG. 2 illustrates an example of a display panel that is driven by the method of FIG. 1, FIG. 3 illustrates an example in which a camera module is disposed under the display panel of FIG. 2, and FIG. 4 illustrates an example of first and second display regions included in the display panel of FIG. 2.

Referring to FIGS. 1, 2, 3, and 4, the method of FIG. 1 may be applied to drive the display panel 100 that includes a first display region FDR having a first resolution in which at least one transparent region TR is located and a second display region SDR having a second resolution higher than the first resolution. The method of FIG. 1 may include determining maximum luminance data among first red data, first green data, and first blue data that are applied to the first display region FDR (S110), calculating a threshold gray-level based on a luminance gain corresponding to a value obtained by dividing a reference luminance of the second display region SDR by a reference luminance of the first display region FDR, a gray-level of the maximum luminance data, and a gamma value that is set for the display panel 100 (S120), selecting a smaller value between the threshold gray-level and the maximum gray-level for the display panel 100 as a gain determination gray-level (S130), calculating a compensation gain corresponding to a value obtained by dividing the gain determination gray-level by the gray-level of the maximum luminance data (S140), generating first compensated red data, first compensated green data, and first compensated blue data by respectively applying the compensation gain to the first red data, the first green data, and the first blue data (S150), displaying a first image in the first display region FDR based on the first compensated red data, the first compensated green data, and the first compensated blue data that are applied to the first display region FDR (S160), and displaying a second image in the second display region SDR based on second red data, second green data, and second blue data that are applied to the second display region SDR (S170).

Referring to FIGS. 2 and 3, a camera module 200 may be disposed under the first display region FDR in the display panel 100, and the camera module 200 may capture an image through the first display region FDR of the display panel 100. In an example embodiment, a sensor module may be disposed under the first display region FDR in the display panel 100, and the sensor module may provide a sensing capability through the first display region FDR. Referring to FIG. 4, transparent regions TR through which the light passes and unit pixels Pc that perform an image displaying operation may be disposed in the first display region FDR, and unit pixels Pn that perform the image displaying operation may be disposed in the second display region SDR. Each of the unit pixels Pn and Pc may include at least one of a red display pixel, a green display pixel, and a blue display pixel. In an example embodiment, the unit pixel Pc of the first display region FDR and the unit pixel Pn of the second display region SDR may have identical structure and/or characteristics. In another example embodiment, the unit pixel Pc of the first display region FDR and the unit pixel Pn of the second display region SDR may have different structure and/or characteristics. For example, a size of a transistor (e.g., a driving transistor) included in the unit pixel Pc of the first display region FDR may be larger than a size of a transistor included in the unit pixel Pn of the second display region SDR. As described above, because at least one transparent region TR is located in the first display region FDR, the number of the unit pixels Pc per a unit area in the first display region FDR is smaller than the number of the unit pixels Pn per a unit area in the second display region SDR. As a result, the first display region FDR may have a relatively low resolution (i.e., a first resolution), and the second display region SDR may have a relatively high resolution (i.e., a second resolution). Accordingly, a luminance of the first display region FDR may be lower than a luminance of the second display region SDR under the same condition, a boundary between the first display region FDR and the second display region SDR may stand out due to the luminance difference that may occur between the first display region FDR and the second display region SDR, and a viewer (or user) may perceive image quality degradation.

In the example embodiment illustrated in FIG. 4, the first resolution of the first display region FDR is ¼ of the second resolution of the second display region SDR, and thus the luminance of the first display region FDR may be about ¼ of the luminance of the second display region SDR under the same condition. Thus, in order to have the same luminance in the first display region FDR and the second display region SDR under the same condition, the unit pixel Pc included in the first display region FDR may emit light with a luminance four times greater than that of the unit pixel Pn included in the second display region SDR. In one embodiment, luminance compensation may be performed by increasing gray-levels of first red data, first green data, and first blue data that are applied to the first display region FDR. In the present example, the unit pixel Pc included in the first display region FDR may be controlled to emit light at the luminance four times greater than that of the unit pixel Pn included in the second display region SDR. The luminance compensation by increasing gray-levels may be possible if the first red data, the first green data, and the first blue data that are applied to the first display region FDR have relatively low gray-levels, and the gray-levels of the first red data, the first green data, and the first blue data can be sufficiently increased. However, if the first red data, the first green data, and the first blue data that are applied to the first display region FDR have relatively high gray-levels, it may be impossible to control the unit pixel Pc included in the first display region FDR to emit light at the luminance four times greater than that of the unit pixel Pn included in the second display region SDR because the gray-levels of the first red data, the first green data, and the first blue data cannot be increased above the maximum gray-level for the display panel 100 (e.g., the 255th gray-level in case of 8-bit data). Thus, the method of FIG. 1 may minimize (or reduce) the luminance difference between the first display region FDR and the second display region SDR by optimally increasing the luminance of the first display region FDR using a gray-level of the maximum luminance data applied to the first display region FDR.

More specifically, the method of FIG. 1 may determine the maximum luminance data among the first red data, the first green data, and the first blue data that are applied to the first display region FDR (S110). In an embodiment, the method of FIG. 1 may determine maximum red luminance data that implements the highest luminance among the first red data, maximum green luminance data that implements the highest luminance among the first green data, and maximum blue luminance data that implements the highest luminance among the first blue data. The data that implements the highest luminance among the maximum red luminance data, the maximum green luminance data, and the maximum blue luminance data may be used as the maximum luminance data. In another embodiment, the method of FIG. 1 may obtain a first count number by counting the first red data in the order of implementing a high luminance, may determine the last counted red data as the maximum red luminance data when the first count number becomes equal to a reference number, may obtain a second count number by counting the first green data in the order of implementing a high luminance, may determine the last counted green data as the maximum green luminance data when the second count number becomes equal to the reference number, may obtain a third count number by counting the first blue data in the order of implementing a high luminance, may determine the last counted blue data as the maximum blue luminance data when the third count number becomes equal to the reference number. The data that implements the highest luminance among the maximum red luminance data, the maximum green luminance data, and the maximum blue luminance data may be used as the maximum luminance data. That is, the method of FIG. 1 may not be limited to determining data that implements the highest luminance among the first red data, the first green data, and the first blue data that are applied to the first display region FDR as the maximum luminance data. In still another embodiment, the method of FIG. 1 may divide a gray-level range for the display panel 100 into sub gray-level ranges, may obtain a first count number by counting the first red data in the order of implementing a high luminance, may determine a first target sub gray-level range to which the last counted red data belongs among the sub gray-level ranges when the first count number becomes equal to a reference number, may determine data corresponding to the lowest gray-level in the first target sub gray-level range as the maximum red luminance data, may obtain a second count number by counting the first green data in the order of implementing a high luminance, may determine a second target sub gray-level range to which the last counted green data belongs among the sub gray-level ranges when the second count number becomes equal to the reference number, may determine data corresponding to the lowest gray-level in the second target sub gray-level range as the maximum green luminance data, may obtain a third count number by counting the first blue data in the order of implementing a high luminance, may determine a third target sub gray-level range to which the last counted blue data belongs among the sub gray-level ranges when the third count number becomes equal to the reference number, may determine data corresponding to the lowest gray-level in the third target sub gray-level range as the maximum blue luminance data. The data that implements the highest luminance among the maximum red luminance data, the maximum green luminance data, and the maximum blue luminance data may be used as the maximum luminance data. As described above, the method of FIG. 1 may determine data that implements the highest luminance among the first red data, the first green data, and the first blue data that are applied to the first display region FDR as the maximum luminance data or may determine data that implements a significant (or meaningful) luminance close to the highest luminance as the maximum luminance data. However, it is understood that determining the maximum luminance data is not limited to the above example embodiments.

Next, the method of FIG. 1 may calculate the threshold gray-level based on the luminance gain corresponding to a value obtained by dividing the reference luminance of the second display region SDR by the reference luminance of the first display region FDR, the gray-level of the maximum luminance data, and a gamma value (e.g., 2.2) that is set for the display panel 100 (S120). In an embodiment, the reference luminance of the first display region FDR may correspond to the maximum luminance of the first display region FDR that is implemented based on reference data (e.g., data having the 255th gray-level), and the reference luminance of the second display region SDR may correspond to the maximum luminance of the second display region SDR that is implemented based on the reference data. Here, since the reference luminance of the first display region FDR and the reference luminance of the second display region SDR may have a fixed (or constant) ratio determined by a structure of the display panel 100, the luminance gain corresponding to the value obtained by dividing the reference luminance of the second display region SDR by the reference luminance of the first display region FDR may also have a fixed (or constant) value. For example, as illustrated in FIG. 4, in a case where the first resolution of the first display region FDR is ¼ of the second resolution of the second display region SDR, the reference luminance of the first display region FDR may be ¼ of the reference luminance of the second display region SDR, and the luminance gain corresponding to the value obtained by dividing the reference luminance of the second display region SDR by the reference luminance of the first display region FDR may be 4. Because the luminance gain corresponding to the value obtained by dividing the reference luminance of the second display region SDR by the reference luminance of the first display region FDR and the gamma value (e.g., 2.2) that is set for the display panel 100 have fixed values, the threshold gray-level may indicate a value obtained by applying the compensation gain corresponding to the luminance gain (e.g., compensation gain=(luminance gain)$^{1/gamma\ value}$) to the gray-level of the maximum luminance data (e.g., by multiplying the gray-level of the maximum luminance data by the compensation gain corresponding to the luminance gain). In one embodiment, the threshold gray-level may be calculated using [Equation 1] below.

$$LGL = MD \times LG^{1/\lambda}, \quad \text{[Equation 1]}$$

where LGL denotes the threshold gray-level, MD denotes the gray-level of the maximum luminance data, LG denotes the luminance gain, and λ denotes the gamma value that is set for the display panel 100.

Subsequently, the method of FIG. 1 may select the smaller value between the threshold gray-level and the maximum gray-level (e.g., the 255th gray-level) for the display panel 100 as the gain determination gray-level (S130) and may calculate the compensation gain corresponding to a value obtained by dividing the gain determination gray-level by the gray-level of the maximum luminance data (S140). Because gray-level compensation for some data may be impossible if the compensation gain corresponding to the luminance gain is directly applied to the first red data, the first green data, and the first blue data that are applied to the first display region FDR in a case where the threshold gray-level is higher than the maximum gray-level for the display panel 100 (e.g., the 255th gray-level), the method of FIG. 1 may prevent a situation in which the gray-level compensation for some data exceeds the maximum gray-level by selecting the maximum gray-level for the display panel 100 (e.g., the 255th gray-level) as the gain determination gray-level in a case where the threshold gray-level is higher than the maximum gray-level for the display panel 100 (e.g., the 255th gray-level). For example, in a case where the gray-level of the maximum luminance data is 190, the luminance gain is 2, the gamma value is 2.2, and the maximum gray-level is 255, the threshold gray-level may be about 260.37. In this case, since the threshold gray-level is higher than the maximum gray-level, the gain determination gray-level may be 255, and the compensation gain may be about 255/190=1.34. Assuming that the gray-level of input data for the image displaying operation in the first display region FDR is 100, the gray-level of compensated input data for the image displaying operation in the first display region FDR may be about 100*1.34=134. In another example, in a case where the gray-level of the maximum luminance data is 190, the luminance gain is 1.25, the gamma value is 2.2, and the maximum gray-level is 255, the threshold gray-level may be about 210.28. In this case, since the threshold gray-level is lower than the maximum gray-level, the gain determination gray-level may be 210.28, and the compensation gain may be about 210.28/190=1.11. Assuming that the gray-level of input data for the image displaying operation in the first display region FDR is 100, the gray-level of compensated input data for the image displaying operation in the first display region FDR may be about 100*1.11=111. As described above, when the method of FIG. 1 applies the compensation gain to the first red data, the first green data, and the first blue data that are applied to the first display region FDR, the method of FIG. 1 may perform the gray-level compensation by adjusting (e.g., reducing) the compensation gain preventing a situation in which the gray-level compensation for some data exceeds the maximum gray-level by performing the gray-level compensation using the compensation gain corresponding to the luminance gain that is obtained by dividing the reference luminance of the second display region SDR by the reference luminance of the first display region FDR.

Next, the method of FIG. 1 may generate the first compensated red data, the first compensated green data, and the first compensated blue data by applying the compensation gain to the first red data, the first green data, and the first blue data (S150). More specifically, the method of FIG. 1 may generate the first compensated red data, the first compensated green data, and the first compensated blue data by calculating gray-levels of the first compensated red data by multiplying gray-levels of the first red data by the compensation gain, by calculating gray-levels of the first compensated green data by multiplying gray-levels of the first green data by the compensation gain, and by calculating gray-levels of the first compensated blue data by multiplying gray-levels of the first blue data by the compensation gain. In an embodiment, the method of FIG. 1 may limit the gray-levels of the first compensated red data, the gray-levels of the first compensated green data, and the gray-levels of the first compensated blue data equal to or below the maximum gray-level for the display panel 100 (e.g., the 255th gray-level) when generating the first compensated red data, the first compensated green data, and the first compensated blue data. Because a smaller value between the threshold gray-level and the maximum gray-level (or one of the threshold gray-level and the maximum gray-level is the same when they are the same) for the display panel 100 (e.g., the 255th gray-level) is selected as the gain determination gray-level when data that implements the highest luminance among the first red data, the first green data, and the first blue data that are applied to the first display region FDR is determined as the maximum luminance data, the gray-levels of the first compensated red data, the gray-levels of the first compensated green data, and the gray-levels of the first compensated blue data may not become (or increased) higher than the maximum gray-level for the display panel 100 (e.g., the 255th gray-level). However, when significant data that implements a luminance close to the highest luminance among the first red data, the first green data, and the first blue data that are applied to the first display region FDR is determined as the maximum luminance data, some data may have a gray-level higher than that of the maximum luminance data among the first red data, the first green data, and the first blue data. In this case, the gray-level of some data among the first compensated red data, the first compensated green data, and the first compensated blue data may become higher than the maximum gray-level for the display panel 100 (e.g., the 255th gray-level). To prevent this from occurring during the gray-level compensation, if the gray-level of some data among the first compensated red data, the first compensated green data, and the first compensated blue data becomes higher than the maximum gray-level for the display panel 100 (e.g., the 255th gray-level), the method of FIG. 1 may change the gray-level of the data that is higher than the maximum gray-level for the display panel 100 to or below the maximum gray-level for the display panel 100 (e.g., the 255th gray-level). As a result, the method of FIG. 1 may limit the gray-levels of the first compensated red data, the gray-levels of the first compensated green data, and the gray-levels of the first compensated blue data equal to or below the maximum gray-level for the display panel 100.

Subsequently, the method of FIG. 1 may display the first image in the first display region FDR based on the first compensated red data, the first compensated green data, and the first compensated blue data that are applied to the first display region FDR (S160) and may display the second image in the second display region SDR based on the second red data, the second green data, and the second blue data that are applied to the second display region SDR (S170). In brief, the method of FIG. 1 may drive the display panel 100 that includes the first display region FDR having the first resolution in which at least one transparent region TR is located and the second display region SDR having the second resolution higher than the first resolution. The method of FIG. 1 may determine the maximum luminance data among the first red data, the first green data, and the first blue data that are applied to the first display region FDR, may calculate the threshold gray-level based on the luminance gain corresponding to the value obtained by dividing the reference luminance of the second display region SDR by the reference luminance of the first display region FDR, the gray-level of the maximum luminance data, and the gamma value that is set for the display panel 100, may select the smaller value between the threshold gray-level and the maximum gray-level for the display panel 100 as the gain determination gray-level, may calculate the compensation gain corresponding to the value obtained by dividing the gain determination gray-level by the gray-level of the maximum luminance data, may generate the first compensated red data, the first compensated green data, and the first compensated blue data by applying the compensation gain to the first red data, the first green data, and the first blue data, may display the first image in the first display region FDR based on the first compensated red data, the first compensated green data, and the first compensated blue data, and may display the second image in the second display region SDR based on the second red data, the second green data, and the second blue data that are applied to the second display region SDR. The method of FIG. 1 may prevent a boundary between the first display region FDR and the second display region SDR from standing out or being perceivable to a user that may be caused by a luminance difference between the first display region FDR and the second display region SDR by optimally increasing the luminance of the first display region FDR such that the luminance difference may be minimized and deterioration of unit pixels Pc included in the first display region FDR may be minimized. As a result, the method of FIG. 1 may prevent or minimize a user's perception of image quality degradation due to the boundary between the first display region FDR and the second display region SDR.

Figure 5:
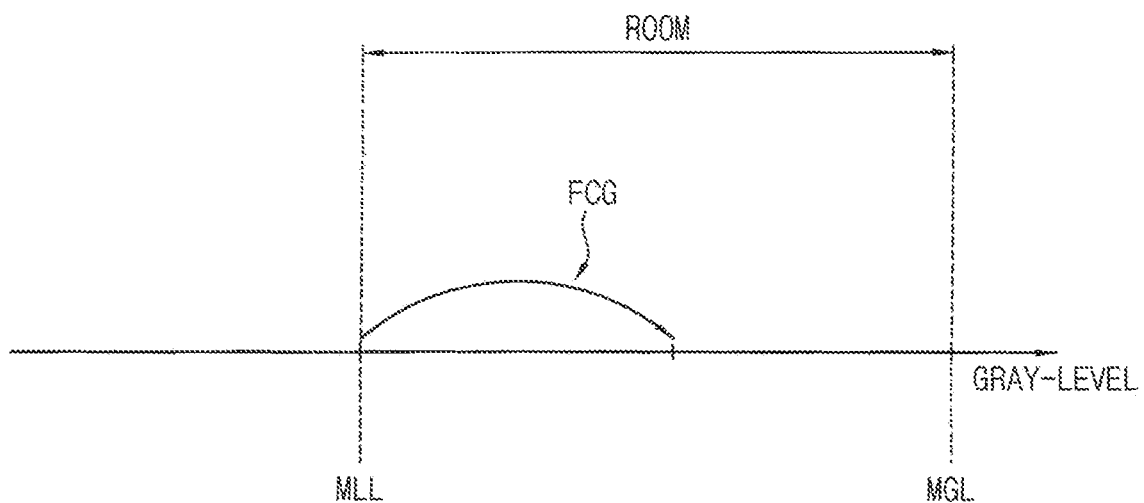
FIGS. 5, 6, and 7 are diagrams for describing application of a compensation gain to data applied to a first display region according to one embodiment.
Figure 6:
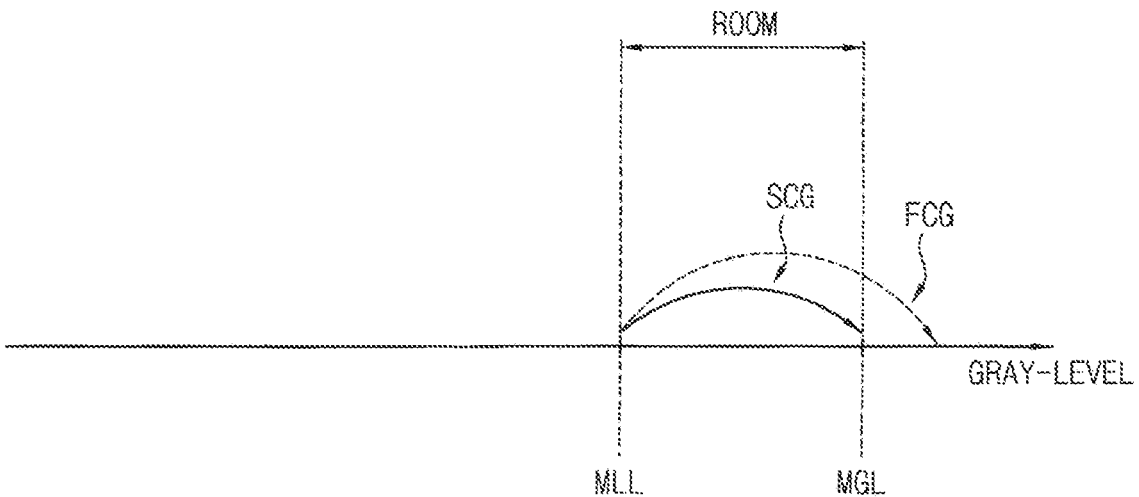
Figure 7:
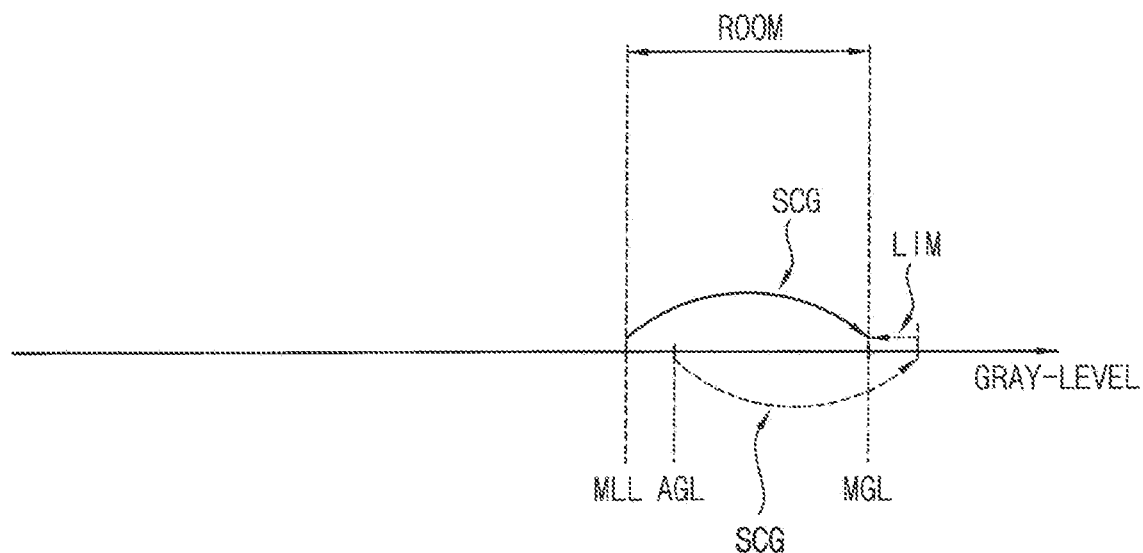

FIGS. 5, 6, and 7 are diagrams for describing that a compensation gain is applied to data applied to a first display region according to one embodiment.

Referring to FIGS. 5, 6, and 7, as described above with reference to FIG. 1, a compensation gain is applied to the first red data, the first green data, and the first blue data that are applied to the first display region FDR by performing a gray-level compensation using the compensation gain corresponding to the luminance gain that is obtained by dividing the reference luminance of the second display region SDR by the reference luminance of the first display region FDR. The gray-level compensation may be performed by adjusting (i.e., reducing) the compensation gain to prevent a situation in which the gray-level compensation for some data exceeds the maximum gray-level.

As illustrated in FIG. 5, if the gray-level MLL of the maximum luminance data that is determined among the first red data, the first green data, and the first blue data that are applied to the first display region FDR is sufficiently low, a space ROOM for performing the gray-level compensation for the first red data, the first green data, and the first blue data may be sufficient. In this case, the gray-level compensation for the first red data, the first green data, and the first blue data may be performed using the compensation gain FCG corresponding to the luminance gain that is obtained by dividing the reference luminance of the second display region SDR by the reference luminance of the first display region FDR. However, as illustrated in FIG. 6, if the gray-level MLL of the maximum luminance data that is determined among the first red data, the first green data, and the first blue data that are applied to the first display region FDR is sufficiently high, the space ROOM for performing the gray-level compensation for some data (i.e., high gray-level data) of the first red data, the first green data, and the first blue data may be insufficient because the gray-level compensation using the compensation gain FCG corresponding to the luminance gain that is obtained by dividing the reference luminance of the second display region SDR by the reference luminance of the first display region FDR may exceed the maximum gray-level MGL for the display panel 100. In this case, the gray-level compensation for the first red data, the first green data, and the first blue data may be performed using the compensation gain SCG that is obtained by dividing the maximum gray-level MGL for the display panel 100 by the gray-level MLL of the maximum luminance data. In one embodiment, as illustrated in FIG. 7, if significant data that implements the luminance close to the highest luminance among the first red data, the first green data, and the first blue data is determined as the maximum luminance data, data AGL may have the gray-level higher than that of the maximum luminance data among the first red data, the first green data, and the first blue data. In this case, even when the gray-level compensation for the first red data, the first green data, and the first blue data may be performed using the compensation gain SCG that is obtained by dividing the maximum gray-level MGL for the display panel 100 by the gray-level MLL of the maximum luminance data, the compensated gray-level of the data AGL may be higher than the maximum gray-level MGL for the display panel 100, and the gray-levels of the first compensated red data, the gray-levels of the first compensated green data, and the gray-levels of the first compensated blue data may be reduced by LIM to being equal to or below the maximum gray-level MGL for the display panel 100.

Figure 8:
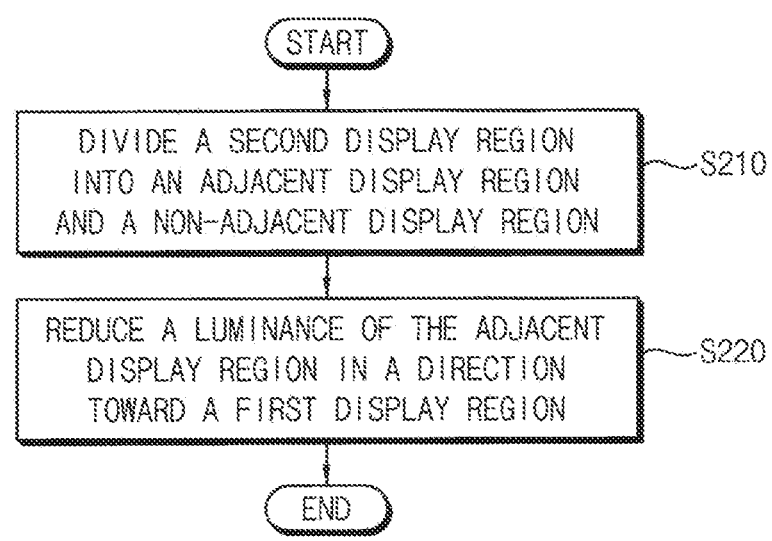
FIG. 8 is a flowchart illustrating an example in which a luminance of an adjacent display region in a second display region is adjusted according to one embodiment.
Figure 9:
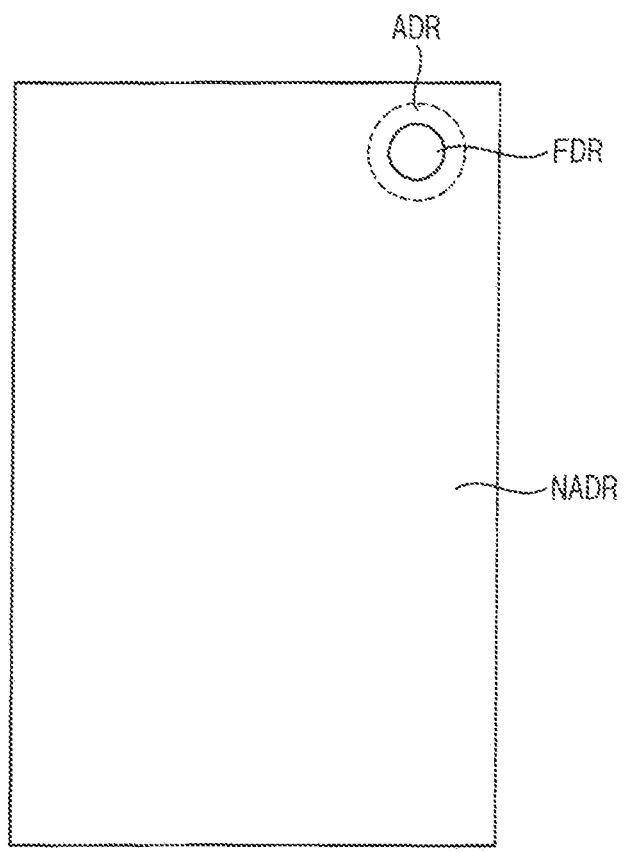
FIG. 9 illustrates an example in which a luminance of an adjacent display region in a second display region is adjusted according to one embodiment.
Figure 10:
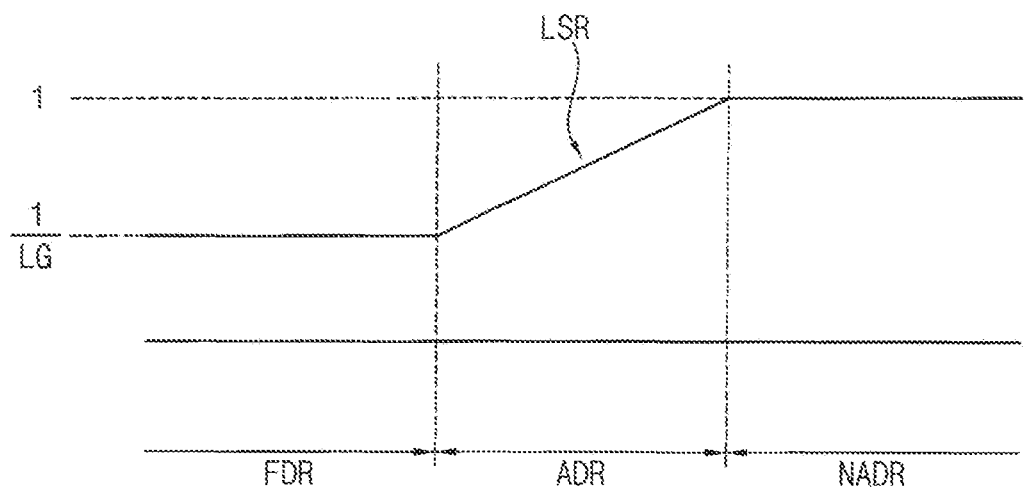
FIG. 10 illustrates an example in which a luminance of an adjacent display region in a second display region is linearly adjusted according to one embodiment.
Figure 11:
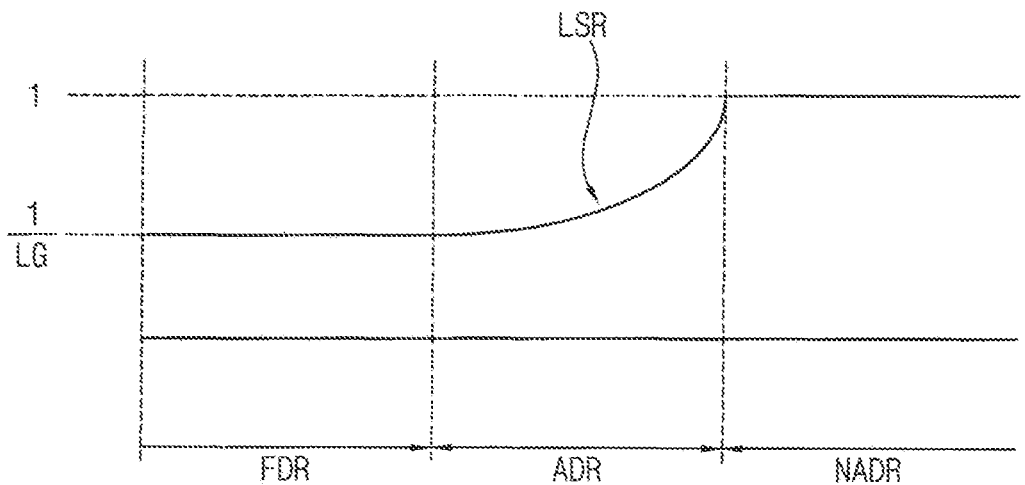
FIG. 11 illustrates an example in which a luminance of an adjacent display region in a second display region is non-linearly adjusted according to one embodiment.

FIG. 8 is a flowchart illustrating an example in which a luminance of an adjacent display region in a second display region is adjusted according to one embodiment, FIG. 9 illustrates an example in which a luminance of an adjacent display region in a second display region is adjusted according to one embodiment, FIG. 10 illustrates an example in which a luminance of an adjacent display region in a second display region is linearly adjusted according to one embodiment, and FIG. 11 illustrates an example in which a luminance of an adjacent display region in a second display region is non-linearly adjusted according to one embodiment.

Referring to FIGS. 8, 9, 10, and 11, the visibility of the boundary between the first display region FDR and the second display region SDR may be alleviated. In one embodiment, the second display region SDR may be divided into the adjacent display region ADR surrounding the first display region FDR and the non-adjacent display region NADR excluding the adjacent display region ADR (S210) and the luminance of the adjacent display region ADR may be reduced in a direction toward the first display region FDR (S220). In other words, an effect of blurring the boundary between the first display region FDR and the second display region SDR may be achieved by reducing the luminance of the adjacent display region ADR of the second display region SDR that surrounds the first display region FDR. In an embodiment, as illustrated in FIG. 10, the luminance of the adjacent display region ADR of the second display region SDR may be reduced linearly in the direction from the non-adjacent display region NADR toward the first display region FDR. In another embodiment, as illustrated in FIG. 11, the luminance of the adjacent display region ADR of the second display region SDR may be reduced non-linearly in the direction from the non-adjacent display region NADR toward the first display region FDR. In one embodiment, the luminance of the adjacent display region ADR of the second display region SDR may be calculated using [Equation 2] below.

$$AL=OL \times LSR,$$ [Equation 2]

where AL denotes the luminance of the adjacent display region ADR, OL denotes an original luminance of the adjacent display region ADR, and LSR denotes a luminance slope ratio.

The minimum value of the luminance slope ratio LSR may be a reciprocal of the luminance gain that is obtained by dividing the reference luminance of the second display region SDR by the reference luminance of the first display region FDR, the maximum value of the luminance slope ratio LSR may be 1, and the luminance slope ratio LSR may be reduced in the direction from the non-adjacent display region NADR toward the first display region FDR. However, the luminance slope ratio LSR is not limited thereto. As described above, the method of FIG. 1 determines the luminance of the adjacent display region ADR by multiplying the original luminance of the adjacent display region ADR by the luminance slope ratio LSR preventing a rapid luminance change from occurring at the boundary between the adjacent display region ADR and the first display region FDR and at the boundary between the adjacent display region ADR and the non-adjacent display region NADR. Thus, the effect of blurring the boundary between the first display region FDR and the second display region SDR may be obtained, and the visibility of the boundary between the first display region FDR and the second display region SDR may be alleviated. However, a user (or viewer) may feel a sense of heterogeneity due to the effect of blurring the boundary between the first display region FDR and the second display region SDR. In this case, the steps S210 and S220 may be performed based on a user setting or command.

Figure 12:
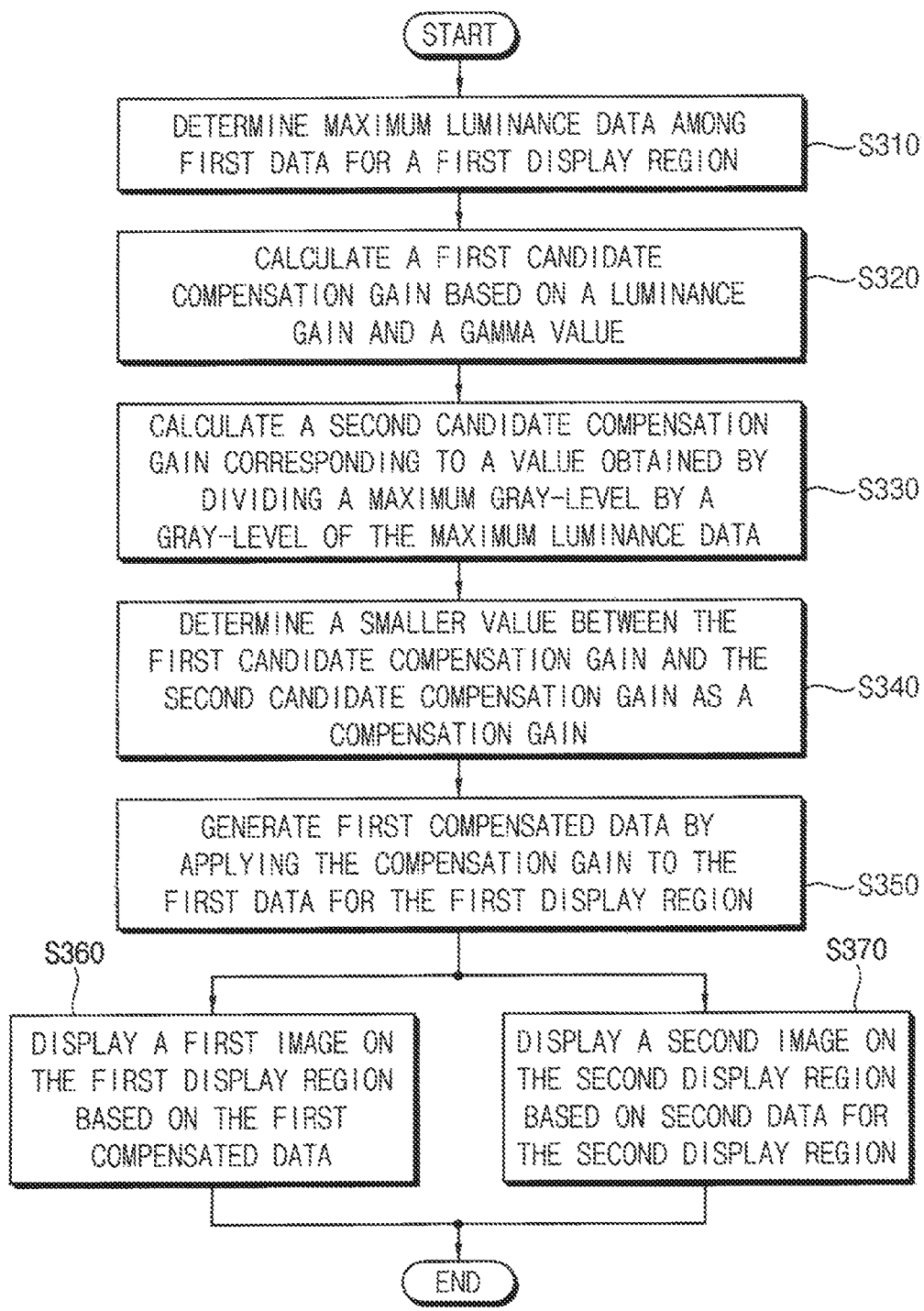
FIG. 12 is a flowchart illustrating a method of driving a display panel according to one embodiment.

FIG. 12 is a flowchart illustrating a method of driving a display panel (e.g., the display panel 100 of FIGS. 2 and 3) according to one embodiment.

Referring to FIG. 12, the method of FIG. 12 may be applied to drive the display panel that includes a first display region (e.g., the first display region FDR of FIGS. 2 and 3) having a first resolution in which at least one transparent region is located and a second display region (e.g., the second display region SDR of FIGS. 2 and 3) having a second resolution higher than the first resolution. The method of FIG. 12 may include determining maximum luminance data among first data (e.g., first red data, first green data, and first blue data) that are applied to the first display region (S310), calculating a first candidate compensation gain based on a luminance gain corresponding to a value obtained by dividing a reference luminance of the second display region by a reference luminance of the first display region and a gamma value that is set for the display panel (S320), calculating a second candidate compensation gain corresponding to a value obtained by dividing the maximum gray-level for the display panel by a gray-level of the maximum luminance data (S330), determining a smaller value between the first candidate compensation gain and the second candidate compensation gain as a compensation gain (S340), generating first compensated data (e.g., first compensated red data, first compensated green data, and first compensated blue data) by applying the compensation gain to the first data (S350), displaying a first image in the first display region based on the first compensated data (S360), and displaying a second image in the second display region based on second data (e.g., second red data, second green data, and second blue data) that are applied to the second display region (S370).

More specifically, the method of FIG. 12 may determine the maximum luminance data among the first data that are applied to the first display region (S310). In an embodiment, the method of FIG. 12 may determine data that implements the highest luminance among the first data that are applied to the first display region as the maximum luminance data. In another embodiment, the method of FIG. 12 may determine significant data that implements the luminance close to the highest luminance among the first data that are applied to the first display region as the maximum luminance data. Next, the method of FIG. 12 may calculate the first candidate compensation gain based on the luminance gain corresponding to a value obtained by dividing the reference luminance of the second display region by the reference luminance of the first display region and a gamma value (e.g., 2.2) that is set for the display panel (S320). In an embodiment, the reference luminance of the first display region may correspond to the maximum luminance of the first display region that is implemented based on reference data (e.g., data having the 255th gray-level), and the reference luminance of the second display region may correspond to the maximum luminance of the second display region that is implemented based on the reference data. Here, since the reference luminance of the first display region and the reference luminance of the second display region may have a fixed (or constant) ratio determined by a structure of the display panel, the luminance gain corresponding to the value obtained by dividing the reference luminance of the second display region by the reference luminance of the first display region may also have a fixed (or constant) value. Because the luminance gain corresponding to the value obtained by dividing the reference luminance of the second display region by the reference luminance of the first display region and the gamma value that is set for the display panel have fixed values, the first candidate compensation gain may be set to be the compensation gain corresponding to the luminance gain that is obtained by dividing the reference luminance of the second display region by the reference luminance of the first display region. In an embodiment, the first candidate compensation gain may be calculated using [Equation 3] below.

$$FCG = LG^{1/\lambda},$$ [Equation 3]

where FCG denotes the first candidate compensation gain, LG denotes the luminance gain, and $\lambda$ denotes the gamma value that is set for the display panel.

For example, when the first resolution of the first display region is ½ of the second resolution of the second display region, the reference luminance of the first display region may be ½ of the reference luminance of the second display region. In this case, the luminance gain that is obtained by dividing the reference luminance of the second display region by the reference luminance of the first display region may be 2. For example, in a case where the gamma value that is set for the display panel is 2.2, the first candidate compensation gain may be $2^{1/2.2}=1.37$.

Subsequently, the method of FIG. 12 may calculate the second candidate compensation gain corresponding to the value obtained by dividing the maximum gray-level (e.g., the 255th gray-level) for the display panel by the gray-level of the maximum luminance data (S330) and may determine the smaller value between the first candidate compensation gain and the second candidate compensation gain as the compensation gain (S340). For example, in a case where the gray-level of the maximum luminance data is 190 and when the maximum gray-level is 255, the second candidate compensation gain may be about $255/190=1.34$. In this case, since the first candidate compensation gain is about $2^{1/2.2}=1.37$, and the second candidate compensation gain is about $255/190=1.34$, the compensation gain may be determined as the second candidate compensation gain (i.e., about $255/190=1.34$). For example, in a case where the gray-level of the maximum luminance data is 150, and the maximum gray-level is 255, the second candidate compensation gain may be about $255/150=1.7$. In this case, since the first candidate compensation gain is about $2^{1/2.2}=1.37$, and the second candidate compensation gain is about $255/150=1.7$, the compensation gain may be determined as the first candidate compensation gain (i.e., about $2^{1/2.2}=1.37$). When the first data that are applied to the first display region have relatively low gray-levels (i.e., when the gray-level of the maximum luminance data is relatively low), the gray-levels of the first data may be sufficiently increased because a space for performing the gray-level compensation is sufficient. In this case, the gray-level compensation for the first data may be performed using the first candidate compensation gain corresponding to the luminance gain that is obtained by dividing the reference luminance of the second display region by the reference luminance of the first display region. On the other hand, when the first data that are applied to the first display region have relatively high gray-levels (i.e., when the gray-level of the maximum luminance data is relatively high), a situation in which the gray-level compensation for some data (i.e., high gray-level data) among the first data may exceed the maximum gray-level because the space for performing the gray-level compensation is insufficient. In this case, the gray-level compensation for the first data may be performed using the second candidate compensation gain that is obtained by dividing the maximum gray-level for the display panel by the gray-level of the maximum luminance data. As described above, when the method of FIG. 12 performs the gray-level compensation for the first data that are applied to the first display region, the method of FIG. 12 may basically perform the gray-level compensation for the first data using the first candidate compensation gain corresponding to the luminance gain that is obtained by dividing the reference luminance of the second display region by the reference luminance of the first display region. Otherwise, the method of FIG. 12 may perform the gray-level compensation for the first data using the second candidate compensation gain that is obtained by dividing the maximum gray-level for the display panel by the gray-level of the maximum luminance data in a situation in which the gray-level compensation for some data (i.e., high gray-level data) may exceed the maximum gray-level.

Next, the method of FIG. 12 may generate the first compensated data by applying the compensation gain to the first data (S350). More specifically, the method of FIG. 12 may generate the first compensated data by calculating the gray-levels of the first compensated data by multiplying the gray-levels of the first data by the compensation gain. In an embodiment, when the first compensated data are generated, the method of FIG. 12 may limit the gray-levels of the first compensated data equal to or below the maximum gray-level (e.g., the 255th gray-level) for the display panel. Because the smaller value between the first candidate compensation gain corresponding to the luminance gain that is obtained by dividing the reference luminance of the second display region by the reference luminance of the first display region and the second candidate compensation gain that is obtained by dividing the maximum gray-level for the display panel by the gray-level of the maximum luminance data is selected as the compensation gain when determining the data that implements the highest luminance among the first data that are applied to the first display region as the maximum luminance data, the gray-levels of the first compensated data may not exceed the maximum gray-level for the display panel (e.g., the 255th gray-level). However, when significant data that implements a luminance close to the highest luminance among the first data that are applied to the first display region is determined as the maximum luminance data, some data having a gray-level higher than that of the maximum luminance data among the first data may exist. In this case, the gray-level of some data among the first compensated data may exceed the maximum gray-level for the display panel (e.g., the 255th gray-level). For this reason, when the gray-level of some data among the first compensated data may exceed the maximum gray-level for the display panel (e.g., the 255th gray-level), the method of FIG. 12 may change the gray-level of those data to or below the maximum gray-level for the display panel (e.g., the 255th gray-level). As a result, the method of FIG. 12 may limit the gray-levels of the first compensated data equal to or below the maximum gray-level for the display panel.

Subsequently, the method of FIG. 12 may display the first image in the first display region based on the first compensated data that are applied to the first display region (S360) and may display the second image in the second display region based on the second data that are applied to the second display region (S370). In some embodiments, the method of FIG. 12 may divide the second display region into an adjacent display region (e.g., the adjacent display region ADR of FIG. 9) surrounding the first display region and a non-adjacent display region (e.g., the non-adjacent display region NADR of FIG. 9) excluding the adjacent display region and may reduce the luminance of the adjacent display region in a direction toward the first display region. Since these are described above, duplicated description related thereto will be omitted. In brief, the method of FIG. 12 may drive the display panel that includes the first display region having the first resolution in which at least one transparent region is located and the second display region having the second resolution higher than the first resolution. Here, the method of FIG. 12 may determine the maximum luminance data among the first data that are applied to the first display region, may calculate the first candidate compensation gain based on the luminance gain corresponding to the value obtained by dividing the reference luminance of the second display region by the reference luminance of the first display region and the gamma value that is set for the display panel, may calculate the second candidate compensation gain corresponding to the value obtained by dividing the maximum gray-level for the display panel by the gray-level of the maximum luminance data, may determine the smaller value between the first candidate compensation gain and the second candidate compensation gain as the compensation gain, may generate the first compensated data by applying the compensation gain to the first data, may display the first image in the first display region based on the first compensated data that are applied to the first display region, and may display the second image in the second display region based on the second data that are applied to the second display region. The method of FIG. 12 may prevent a boundary between the first display region and the second display region from standing out or being perceivable to a user that may be caused by a luminance difference between the first display region and the second display region by optimally increasing the luminance of the first display region such that the luminance difference may be minimized and deterioration of unit pixels included in the first display region may be minimized. As a result, the method of FIG. 12 may prevent or minimize a user's perception of image quality degradation due to existence of the first display region.

Figure 13:
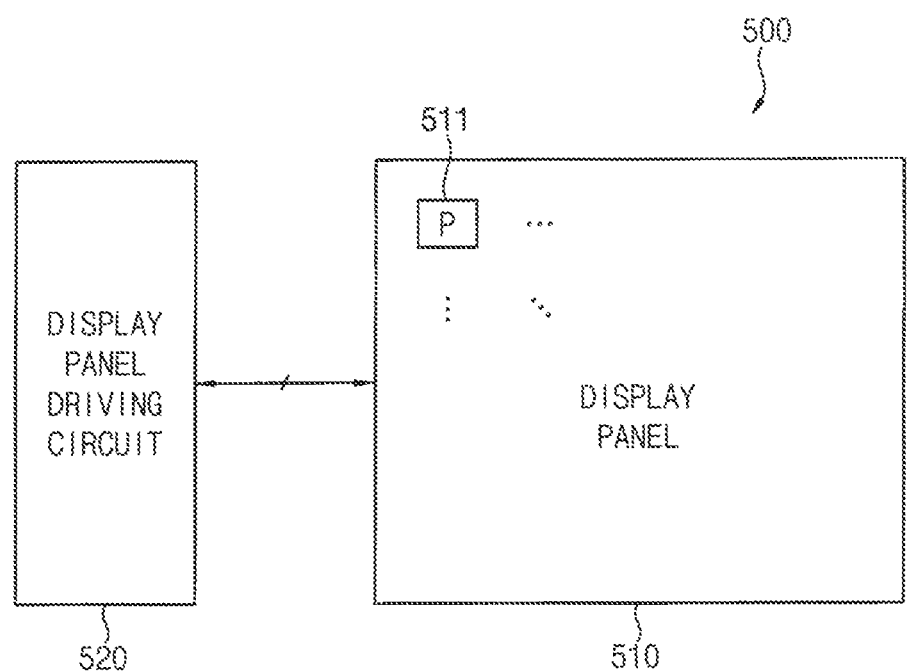
FIG. 13 is a block diagram illustrating a display device according to one embodiment.

FIG. 13 is a block diagram illustrating a display device according to one embodiment.

Referring to FIG. 13, the display device 500 may include a display panel 510 and a display panel driving circuit 520. In an embodiment, a camera module (e.g., the camera module 200 of FIG. 3) may be disposed under a first display region included in the display panel 510, and the camera module may capture an image through the first display region. In another embodiment, a sensor module may be disposed under a first display region included in the display panel 510, and the sensor module may provide a sensing capability through the first display region. For example, the display device 500 may be an organic light-emitting display device or a liquid crystal display device. However, the display device 500 is not limited thereto.

The display panel 510 may include the first display region having a first resolution in which at least one transparent region is located and a second display region having a second resolution higher than the first resolution. In the first display region, at least one transparent region through which light passes and unit pixels 511 for an image display may be located. In the second display region, unit pixels 511 for the image display may be located without any transparent region. Here, each of the unit pixels 511 may include at least one of a red display pixel, a green display pixel, and a blue display pixel. In an embodiment, the unit pixel 511 in the first display region and the unit pixel 511 in the second display region may have the same structure and/or characteristics. In another embodiment, the unit pixel 511 of the first display region and the unit pixel 511 of the second display region may have different structure and/or characteristics. Because at least one transparent region may be located in the first display region, the number of the unit pixels 511 per unit area in the first display region may be less than the number of the unit pixels 511 per unit area in the second display region. As a result, the first display region may have a relatively low resolution (i.e., the first resolution), and the second display region may have a relatively high resolution (i.e., the second resolution). Under the same condition, a luminance of the first display region may be lower than a luminance of the second display region, therefore a luminance difference between the first display region and the second display region may occur. In this case, a boundary between the first display region and the second display region may stand out due to the luminance difference, and a user (or a viewer) may perceive image quality degradation if the luminance difference is not compensated for.

The display panel driving circuit 520 may drive the display panel 510. In one embodiment, the display panel driving circuit 520 may include a scan driver, a data driver, a luminance compensating controller, a timing controller, etc. The display panel 510 may be electrically connected to the data driver via data lines and may be electrically connected to the scan driver via scan lines. The data driver may provide a data signal (e.g., first compensated data for the first display region and second data for the second display region) to the unit pixels 511 of the display panel 510 via the data lines. The scan driver may provide a scan signal to the unit pixels 511 of the display panel 510 via the scan lines. The luminance compensating controller may prevent or minimize deterioration of the unit pixels 511 included in the first display region by optimally increasing the luminance of the first display region. In addition, the luminance compensating controller may prevent or minimize the boundary between the first display region and the second display region from standing out or being perceivable to a user that may be caused by the luminance difference between the first display region and the second display region by minimizing the luminance difference between the first display region and the second display region. In an embodiment, the luminance compensating controller may be implemented inside the timing controller. In another embodiment, the luminance compensating controller may be implemented independently outside the timing controller. The timing controller may generate a plurality of control signals and may provide the control signals to control the scan driver, the data driver, the luminance compensating controller, etc. In some embodiments, the timing controller may perform further data processing such as pixel deterioration compensation.

In an embodiment, the luminance compensating controller may determine maximum luminance data among first red data, first green data, and first blue data for the first display region, may calculate a threshold gray-level based on a luminance gain corresponding to a value obtained by dividing a reference luminance of the second display region by a reference luminance of the first display region, a gray-level of the maximum luminance data, and a gamma value that is set for the display panel 510, may select a smaller value between the threshold gray-level and the maximum gray-level for the display panel 510 as a gain determination gray-level, may calculate a compensation gain corresponding to a value obtained by dividing the gain determination gray-level by the gray-level of the maximum luminance data, may generate first compensated red data, first compensated green data, and first compensated blue data by applying the compensation gain to the first red data, the first green data, and the first blue data, may display a first image in the first display region based on the first compensated red data, the first compensated green data, and the first compensated blue data, and may display a second image in the second display region based on second red data, second green data, and second blue data for the second display region. In another embodiment, the luminance compensating controller may determine maximum luminance data among first data for the first display region (e.g., first red data, first green data, and first blue data), may calculate a first candidate compensation gain based on a luminance gain corresponding to a value obtained by dividing a reference luminance of the second display region by a reference luminance of the first display region and a gamma value that is set for the display panel 510, may calculate a second candidate compensation gain corresponding to a value obtained by dividing the maximum gray-level for the display panel 510 by a gray-level of the maximum luminance data, may determine a smaller value between the first candidate compensation gain and the second candidate compensation gain as a compensation gain, may generate first compensated data by applying the compensation gain to the first data, may display a first image in the first display region based on the first compensated data, and may display a second image in the second display region based on second data for the second display region (e.g., second red data, second green data, and second blue data).

Figure 14:
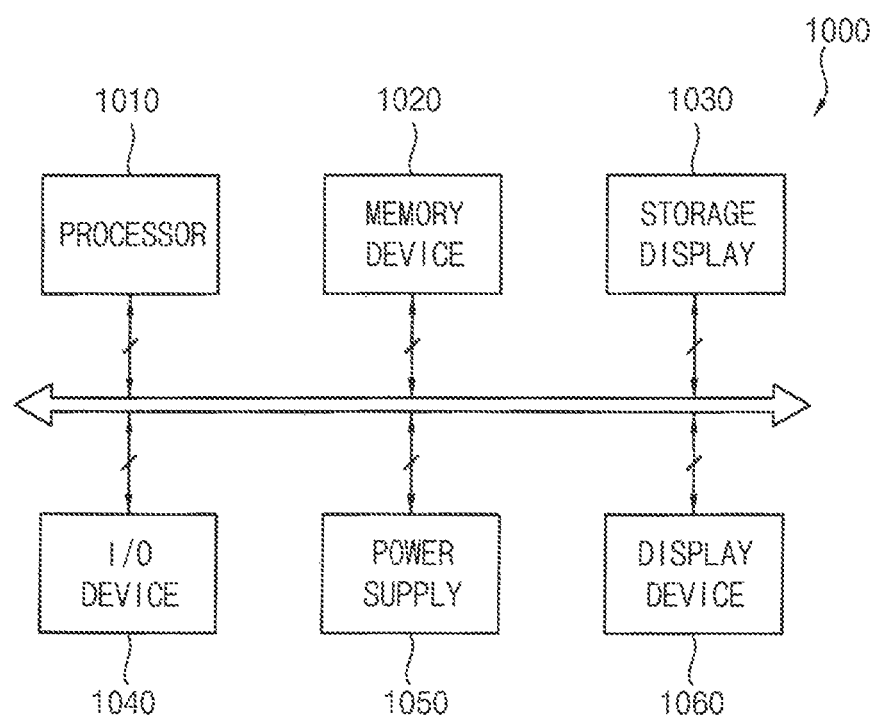
FIG. 14 is a block diagram illustrating an electronic device according to one embodiment.
Figure 15:
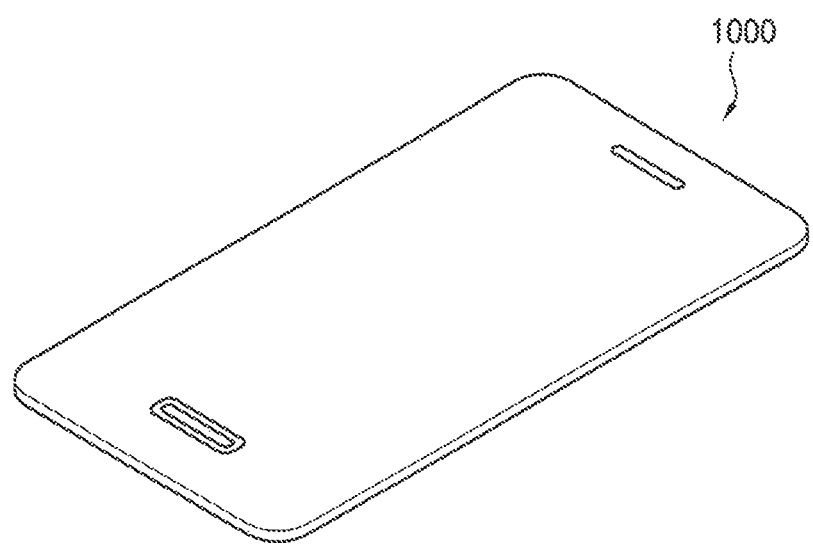
FIG. 15 illustrates a smartphone as an example embodiment of the electronic device of FIG. 14.

FIG. 14 is a block diagram illustrating an electronic device according to one embodiment, and FIG. 15 illustrates a smartphone as an example embodiment of the electronic device of FIG. 14.

Referring to FIGS. 14 and 15, the electronic device 1000 may include a processor 1010, a memory device 1020, a storage device 1030, an input/output (I/O) device 1040, a power supply 1050, and a display device 1060. The display device 1060 may be the display device 500 of FIG. 13. The electronic device 1000 may further include a plurality of ports (not shown) for communicating with various electronic devices or peripheral devices including, but not limited to, a video card, a sound card, a memory card, and a universal serial bus (USB) device. In an embodiment, as illustrated in FIG. 15, the electronic device 1000 may be implemented as a smartphone. However, the electronic device 1000 is not limited thereto. Other examples of the electronic device 1000 may include a cellular phone, a video phone, a smart pad, a smart watch, a tablet PC, a car navigation system, a computer monitor, a laptop computer, a head mounted display (HMD) device, etc.

The processor 1010 may perform various computing tasks. The processor 1010 may be a microprocessor, a central processing unit (CPU), an application processor (AP), etc. The processor 1010 may be coupled to other components via an address bus, a control bus, a data bus, etc. Further, the processor 1010 may be coupled to an extended bus such as a peripheral component interconnection (PCI) bus. The memory device 1020 may store data for operating the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. and/or at least one volatile memory device such as a dynamic random access memory (DRAM) device, a static random access memory (SRAM) device, a mobile DRAM device, etc. The storage device 1030 may include a solid state drive (SSD) device, a hard disk drive (HDD) device, a CD-ROM device, etc. The I/O device 1040 may include an input device such as a keyboard, a keypad, a mouse device, a touch pad, a touch screen, etc., and an output device such as a printer, a speaker, etc. In some embodiments, the I/O device 1040 may include the display device 1060. The power supply 1050 may provide power for operating the electronic device 1000. The display device 1060 may be coupled to other components via the above-described buses or other communication links.

As described above, the display device 1060 may include a display panel (e.g., the display panel 100 of FIG. 1) that includes a first display region having a first resolution in which at least one transparent region is located and a second display region having a second resolution higher than the first resolution. In an embodiment, a display panel driving circuit of the display device 1060 (e.g., the display panel driving circuit 520 of the display device 500 illustrated in FIG. 13) may determine maximum luminance data among first red data, first green data, and first blue data for the first display region, may calculate a threshold gray-level based on a luminance gain corresponding to a value obtained by dividing a reference luminance of the second display region by a reference luminance of the first display region, a gray-level of the maximum luminance data, and a gamma value that is set for the display panel, may select a smaller value between the threshold gray-level and the maximum gray-level for the display panel as a gain determination gray-level, may calculate a compensation gain corresponding to a value obtained by dividing the gain determination gray-level by the gray-level of the maximum luminance data, may generate first compensated red data, first compensated green data, and first compensated blue data by applying the compensation gain to the first red data, the first green data, and the first blue data, may display a first image in the first display region based on the first compensated red data, the first compensated green data, and the first compensated blue data, and may display a second image in the second display region based on second red data, second green data, and second blue data for the second display region. In another embodiment, the display panel driving circuit may determine maximum luminance data among first data for the first display region (e.g., first red data, first green data, and first blue data), may calculate a first candidate compensation gain based on a luminance gain corresponding to a value obtained by dividing a reference luminance of the second display region by a reference luminance of the first display region and a gamma value that is set for the display panel, may calculate a second candidate compensation gain corresponding to a value obtained by dividing the maximum gray-level for the display panel by a gray-level of the maximum luminance data, may determine a smaller value between the first candidate compensation gain and the second candidate compensation gain as a compensation gain, may generate first compensated data by applying the compensation gain to the first data, may display a first image in the first display region based on the first compensated data, and may display a second image in the second display region based on second data for the second display region (e.g., second red data, second green data, and second blue data).

The present inventive concept may be applied to a display device and an electronic device including the display device. For example, the present inventive concept may be applied to a smartphone, a cellular phone, a video phone, a smart pad, a smart watch, a tablet PC, a car navigation system, a television, a computer monitor, a laptop computer, a head mounted display device, an MP3 player, etc.

The foregoing is illustrative of example embodiments of the present inventive concept and is not to be construed as limiting thereof. Although some example embodiments have been described, those skilled in the art will readily appreciate that many modifications and deviations are possible in the example embodiments without materially departing from the novel teachings and advantages of the present inventive concept. Accordingly, such modifications and deviations are intended to be included within the scope of the present inventive concept. Therefore, it is to be understood that the foregoing is illustrative of various example embodiments and is not to be construed as limited to the specific embodiments disclosed, and that modifications and deviations to the disclosed example embodiments, as well as other embodiments, are intended to be included within the scope of the present disclosure and/or the appended claims.

What is claimed is:

1. A method of driving a display panel that includes a first display region having a first resolution and a second display region being adjacent to the first display region and having a second resolution higher than the first resolution, the method comprising:

determining maximum luminance data among first red data, first green data, and first blue data that are applied to the first display region;

calculating a threshold gray-level based on (1) a luminance gain corresponding to a value obtained by dividing a second reference luminance of the second display region by a first reference luminance of the first display region, (2) a gray-level of the maximum luminance data, and (3) a gamma value for the display panel;

selecting a smaller value between the threshold gray-level and a maximum gray-level for the display panel as a gain determination gray-level;

calculating a compensation gain corresponding to a value obtained by dividing the gain determination gray-level by the gray-level of the maximum luminance data;

generating first compensated red data, first compensated green data, and first compensated blue data by applying the compensation gain to the first red data, the first green data, and the first blue data;

displaying a first image in the first display region based on the first compensated red data, the first compensated green data, and the first compensated blue data; and displaying a second image in the second display region based on second red data, second green data, and second blue data that are applied to the second display region.

2. The method of claim 1, wherein a camera module that captures an image or a sensor module that provides a sensing capability is disposed under the first display region.

3. The method of claim 1, wherein determining the maximum luminance data comprises:

determining maximum red luminance data among the first red data;

determining maximum green luminance data among the first green data;

determining maximum blue luminance data among the first blue data; and determining data that has a highest luminance among the maximum red luminance data, the maximum green luminance data, and the maximum blue luminance data as the maximum luminance data.

4. The method of claim 1, wherein determining the maximum luminance data comprises:

obtaining a first count number by counting the first red data in a first order of implementing a first high luminance;

determining last counted red data as maximum red luminance data based on the first count number being equal to a reference number;

obtaining a second count number by counting the first green data in a second order of implementing a second high luminance;

determining last counted green data as maximum green luminance data based on the second count number being equal to the reference number;

obtaining a third count number by counting the first blue data in a third order of implementing a third high luminance;

determining last counted blue data as maximum blue luminance data based on the third count number becomes being equal to the reference number; and determining data that has a highest luminance among the maximum red luminance data, the maximum green luminance data, and the maximum blue luminance data as the maximum luminance data.

5. The method of claim 1, wherein determining the maximum luminance data comprises:

dividing a gray-level range for the display panel into sub gray-level ranges;
obtaining a first count number by counting the first red data in a first order of implementing a first high luminance;
determining a first target sub gray-level range to which last counted red data belongs among the sub gray-level ranges based on the first count number being equal to a reference number;
determining data corresponding to a first lowest gray-level in the first target sub gray-level range as maximum red luminance data;
obtaining a second count number by counting the first green data in a second order of implementing a second high luminance;
determining a second target sub gray-level range to which last counted green data belongs among the sub gray-level ranges based on the second count number being equal to the reference number;
determining data corresponding to a second lowest gray-level in the second target sub gray-level range as maximum green luminance data;
obtaining a third count number by counting the first blue data in a third order of implementing a third high luminance;
determining a third target sub gray-level range to which last counted blue data belongs among the sub gray-level ranges based on the third count number being equal to the reference number;
determining data corresponding to a third lowest gray-level in the third target sub gray-level range as maximum blue luminance data; and
determining data that implements a highest luminance among the maximum red luminance data, the maximum green luminance data, and the maximum blue luminance data as the maximum luminance data.

6. The method of claim 1, wherein the threshold gray-level is calculated by:

$$LGL=MD \times LG^{1/\lambda},$$

where LGL denotes the threshold gray-level, MD denotes the gray-level of the maximum luminance data, LG denotes the luminance gain, and λ, denotes the gamma value for the display panel.

7. The method of claim 6, wherein the first reference luminance of the first display region corresponds to a first maximum luminance of the first display region based on reference data, and the second reference luminance of the second display region corresponds to a second maximum luminance of the second display region based on the reference data.

8. The method of claim 1, wherein generating the first compensated red data, the first compensated green data, and the first compensated blue data comprises:
calculating first gray-levels of the first compensated red data by multiplying gray-levels of the first red data by the compensation gain;
calculating second gray-levels of the first compensated green data by multiplying gray-levels of the first green data by the compensation gain; and
calculating third gray-levels of the first compensated blue data by multiplying gray-levels of the first blue data by the compensation gain.

9. The method of claim 8, wherein generating the first compensated red data, the first compensated green data, and the first compensated blue data further comprises:
limiting the first gray-levels of the first compensated red data, the second gray-levels of the first compensated green data, and the third gray-levels of the first compensated blue data to being equal to or below the maximum gray-level for the display panel.

10. The method of claim 1, further comprising:
dividing the second display region into an adjacent display region surrounding the first display region and a non-adjacent display region excluding the adjacent display region; and
reducing a luminance of the adjacent display region in a direction from the non-adjacent display region toward the first display region.

11. The method of claim 10, wherein the luminance of the adjacent display region is linearly reduced in the direction from the non-adjacent display region toward the first display region.

12. The method of claim 10, wherein the luminance of the adjacent display region is non-linearly reduced in the direction from the non-adjacent display region toward the first display region.

13. The method of claim 10, wherein the luminance of the adjacent display region is calculated by:

$$AL=OL \times LSR,$$

where AL denotes the luminance of the adjacent display region, OL denotes an original luminance of the adjacent display region, and LSR denotes a luminance slope ratio.

14. The method of claim 13, wherein a minimum value of the luminance slope ratio is a reciprocal of the luminance gain, a maximum value of the luminance slope ratio is 1, and the luminance slope ratio is reduced in the direction from the non-adjacent display region toward the first display region.

* * * * *